United States Patent

[11] 3,590,158

| [72] | Inventor | Wolfgang Pabst |
| --- | --- | --- |
| | | Neu-Isenburg, Germany |
| [21] | Appl. No. | 755,178 |
| [22] | Filed | Aug. 26, 1968 |
| [45] | Patented | June 29, 1971 |
| [73] | Assignee | Licentia Patent-Verwaltungs-G.m.b.H. |
| | | Frankfurt am Main, Germany |

[54] AUTOMATIC NUMERICAL INDICATION OF SURFACE LOCATIONS
16 Claims, 6 Drawing Figs.

[52] U.S. Cl. ................................................. 178/18
[51] Int. Cl. .................................................. G08c 21/00
[50] Field of Search .......................................... 178/18, 19, 20; 340/166, 324.1, 365

[56] References Cited
UNITED STATES PATENTS

| 3,495,232 | 2/1970 | Wagner ....................... | 340/324 |
| 3,342,935 | 9/1967 | Leifer ........................... | 178/19 |
| 3,522,664 | 8/1970 | Lambright et al. ........... | 178/18 |

Primary Examiner—Kathleen H. Claffy
Assistant Examiner—Tom D'Amico
Attorney—Spencer & Kaye ABSTRACT: A device for automatically producing a numerical representation of the location of any elemental area on a working surface, which device includes a matrix defining the working surface and composed of two mutually transverse sets of parallel conductive elements, the elements of one set being elastically deformable and the two sets being disposed parallel to one another and spaced apart by a small distance which permits any elastically deformable element of the one set to contact an element of the other set when subjected to a deforming pressure, the device further including a pulse generator for applying signal pulses to both sets of elements in such a manner that a pulse is present on only one set of elements at any given instant, and logic circuits each having one input connected to a respective element of one set, another input connected to a respective element of the other set, and an output at which a signal appears only when a pulse is applied to both of the elements to which its inputs are connected, this occurring when a pulse is applied to the elements of one set and one of the elements of the one set contacts one element of the other set.

Inventor:
Wolfgang Pabst
By: Spencer & Kaye
Attorneys

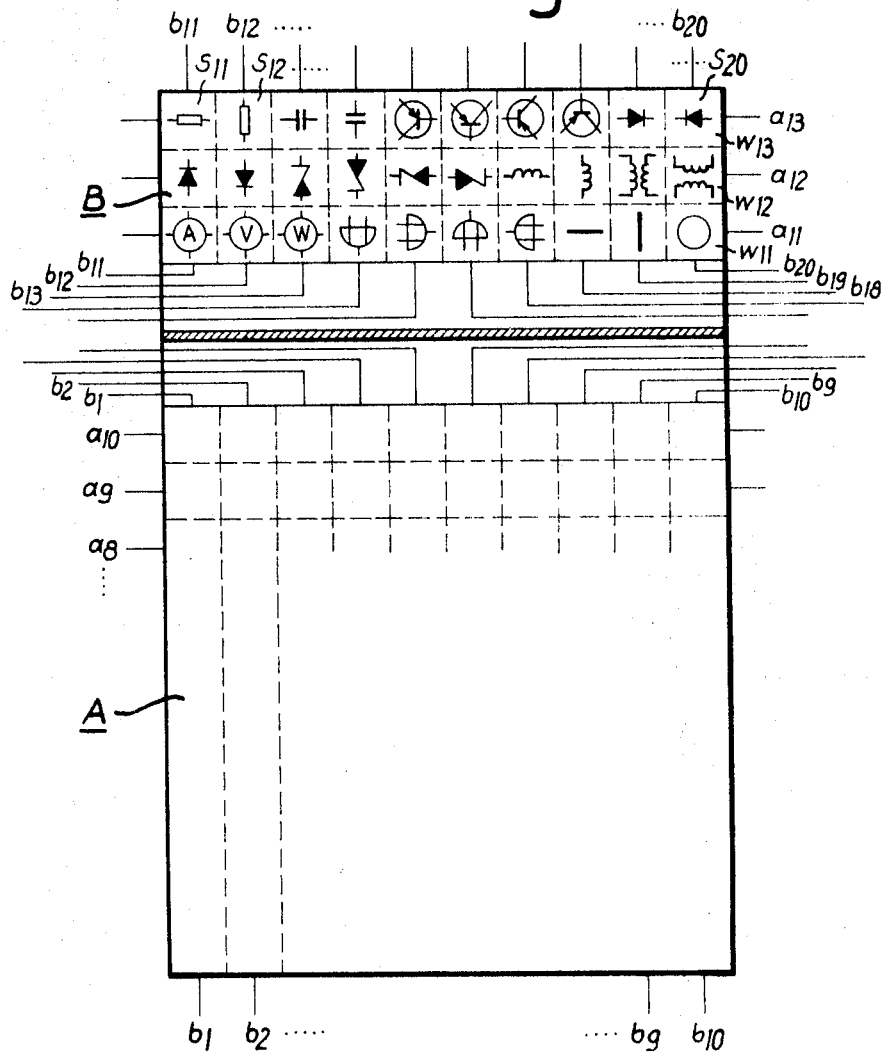

AUTOMATIC NUMERICAL INDICATION OF SURFACE LOCATIONS

BACKGROUND OF THE INVENTION

The present invention relates to an arrangement for automatically converting into numerical form locations and/or symbols which are disposed on a drawing surface or which are to be applied thereto, this conversion being produced by a matrix having intersecting conductive paths to which electric signals are applied and by an instrument which exerts a local pressure on a flexible tracing surface of the matrix.

In many cases the compilation of control programs for numerically controlled processing machines is a monotonous task which, however, requires complete concentration on the part of the programmer. This leads rapidly and inevitably to mental fatigue which is responsible for the occurrence of unavoidable errors. In order to reduce the costs of programming routine tasks, special programming languages have been created which permit the programmer to give only general directions to a computer which accomplishes the arithmetical calculations necessary for carrying out these directions.

It is often desired to feed graphic information into a computer in such a manner that the computer can automatically produce a control program therefrom for numerically controlled processing or drafting machines. It is known to provide for this purpose photoelectronically operated scanning devices which trace over the lines to be transmitted and which thus influence position measuring systems. The values indicated by these systems are digitally stored at discrete locations on a program carrier; e.g. a punched tape, which then controls a numerically controlled processing machine. The followup devices, which have photoelectronic measuring systems and special regulating drives necessary for performing this method of programming, as well as the digital position-measuring system, require considerable expenditures.

Another known method for feeding a computer with graphic data consists in scanning the position of a light spot on a cathode-ray tube by means of an electron beam, digitalizing the scanning result and feeding it into a computer which then determines the intensity of the electron beam. The results can then be graphically reproduced directly on the cathode-ray tube. A conversion of the scanning results into a form suitable for controlling numerically controlled machines can theoretically be accomplished by this known method but it would then be necessary to have a bank of computers permanently available even during the sketching operation and this would require unjustifiable expenditures.

A further known device for converting a graphic representation into binary coded information uses a frame covered by a plate provided with holes which are distributed in raster fashion. Along one longitudinal side of the frame a binary scale is disposed and a transverse support which can be moved across the plate is also provided with a binary scale. A displaceable stylus mount provided with a pressure stylus which traces a drawing placed onto the plate is disposed on the transverse support. The pressure stylus must penetrate the drawing to actuate a switch disposed below a particular hole. Such a device is complicated and expensive to build. The drawing to be traced is destroyed by the penetration of the stylus therethrough.

A matrix is further known which consists of a pressure-sensitive resistance layer disposed between the crossing conductive paths. A stylus exerts a local pressure onto the pressure-sensitive resistance layer to cause the layer to be deformed at the point of pressure and to thus change its resistance value at this point. In this matrix it is not certain that an unequivocal signal will be received to definitely identify the particular position.

A simple by very instructive example of the problems with which the present invention is concerned is the compilation of a program for controlling the cutting out of the conductive paths of a printed circuit board by means of a numerically controlled processing machine. To this end, it is first necessary to prepare a drawing of the desired circuit on graph paper. The points between which the cutting tool is to remove conductive material or where particular processing steps are to take place, e.g. holes are to be drilled, must be determined by measuring along two coordinates their distance from a reference point and the data thus derived must be recorded on a data sheet. Upon completion of the sketch and compilation of all the necessary data, the latter, e.g. the position values, must be manually transferred into a punching machine, in a form adapted to the type of control mechanism used for the cutting machine, where a punched tape is prepared.

In contradistinction to this cumbersome and time-consuming process of measuring the positions and of transferring them to the punching machine, the time required for the actual processing operation, i.e. cutting of the printed circuit board, is extremely short.

SUMMARY OF THE INVENTION

It is a primary object of the present invention to overcome these drawbacks and difficulties.

Another object of the invention is to substantially reduce the time required for designing a circuit board.

Still another object of the invention is to provide an improved arrangement for automatically producing a stored indication of any location on a working surface.

Yet another object of the invention is to substantially simplify the mental effort required by the circuit designer.

A still further object of the invention is to provide a programming aid which, at acceptably low cost, provides an automatic conversion of the locations and/or symbols indicated by means of a pressure pen into numerical data for direct control of a processing machine or for further processing in a bank of computers.

These and other objects according to the invention are achieved by a novel device for automatically producing a numerical representation of the location of any elemental area on a working surface. This device essentially includes a first set of elongated, parallel, substantially coplanar conductive elements which are electrically isolated from each other, a second set of similar conductive elements disposed adjacent the first set so that the planes defined by the two sets are substantially parallel, pulse generator means having a first output connected to the elements of the first set and a second output connected to the elements of the second set, and a plurality of logic circuits each having a first input connected to a respective element of the first set, a second input connected to a respective element of the second set, and an output at which a signal appears only when a signal appears simultaneously on the two elements connected to its inputs. The second set of conductive elements is disposed relative to the first set so that the elements of the first set are oriented transversely to the elements of the second set, the elements of the second set being elastically deformable in a direction transverse to their plane and the two sets being spaced from one another to be normally out of contact and to permit an element of the second set to be elastically deformed to physically and conductively contact an element of the first set upon the application of a deforming pressure to the element of the second set. The two sets of elements together define a matrix in which each region where an element of the second set crosses an element of the first set constitutes an elemental area of the working surface, wherein each such elemental area is defined by a unique combination of one element of each set. The pulse generator means are arranged so that the signal pulses applied to the elements of the second set occur during the intervals between the pulses applied to the first set so that only one set receives a pulse at any instant. This arrangement operates to that when contact is made between two crossing elements, a signal pulse applied to the first set will also appear on the crossing element of the second set and an output signal will be produced only by that logic circuit whose second input is connected to such crossing element of the second set, and a subsequent signal pulse applied to the second set will also appear on the crossing element of the first set and an output signal will be produced only by that logic circuit whose first input is connected to such crossing element of the first set.

BRIEF DESCRIPTION OF THE DRAWINGS

FIG. 1b is a side view of the device of FIG. 1a.

FIG. 3 is a pictorial view of a support device for parallel conductive paths intended for combined position and symbol processing.

DESCRIPTION OF THE PREFERRED EMBODIMENTS

In a device according to the invention, the supporting device for one set of parallel conductive paths can be a baseplate with groove-type recesses disposed between the conductive paths and insulating the paths from each other. These grooves serve to hold strips of insulating material which, in the simplest case, are threads of a synthetic material which, in the simplest case, are threads of a synthetic material such as nylon or materials sold under the trademark Perlon or Teflon.

Above this baseplate there are disposed parallel deformable conductive paths which cross the conductive paths of the baseplate at right angles and which are insulated from each other. This could be accomplished by placing individual, separated thin metal strips which are elastically prestressed on top of the synthetic threads, in which case the threads are dimensioned to extend slightly above the surface of the conductive paths of the baseplate. However, when a large number of parallel conductive paths are to be provided, this type of mounting can become very difficult and mechanically complicated. In such cases it then proves to be more advantageous to form the conductive paths from a metal lamination of an elastic synthetic foil, to dispose the foil upon the synthetic strips of the baseplate and to elastically tension the foil in the plane formed thereby.

The inputs of all conductive paths are preferably connected to a single pulse generator which is provided for the emission of binary signals to form the logic "0" and the logic "L" (herein "L" will be used to represent "1"), the desired time relation between the feeding of the clock pulses fed to one set of conductive paths and to the other set being accomplished simply by means of a delay element.

The logic elements can, for example, be NOR elements each having one input connected to a conductor of one set and its other input connected to that conductor of the other set which is the corresponding location in its set. To convert the output signals of the logic elements, each having any one of $n$ forms, into binary form, a matrix is provided which emits, for example, natural binary signals or binary-coded decimal signals which are applied, preferably via an electronic switching device, to associated memory elements. These memories, which, for binary-coded decimal signals, store the signals in tetrads, serve mainly to prevent transfer and further processing of signals resulting from a plurality of immediately consecutive contacts of the same crossing conductive paths. The output signals of the memories are converted, via further switching devices and matrices, into a code adapted to the control mechanism of a numerically controlled processing machine or a computer bank and control the control electrodes of a device which applies appropriate markings on a program carrier, e.g. in the form of combinations of holes on a punched tape.

Figure 1A:
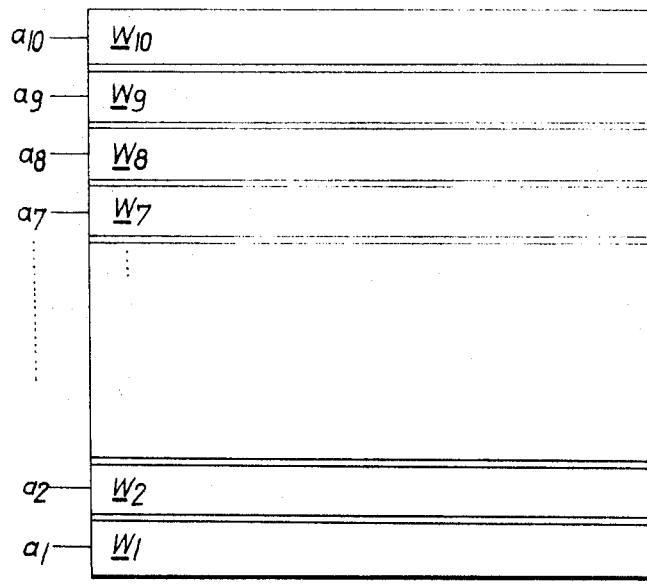
FIG. 1a is a plan view of a support device for one set of parallel conductive paths intended for position processing.
Figure 1B:
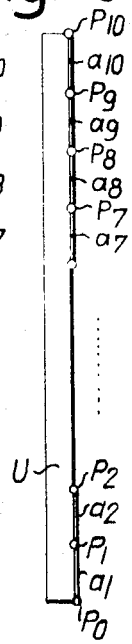

In FIGS. 1a and 1b a baseplate U of insulating material, which is shown in plan and side view, respectively, is provided with conductive paths $W_1, W_2, ... W_7, W_8, W_9, W_{10}$ of metal, the paths being separated from each other by grooves. In these grooves elastic threads $P_0, P_1, P_2, ... P_7, P_8, P_{10}$ of insulating synthetic material are provided.

Figure 1C:
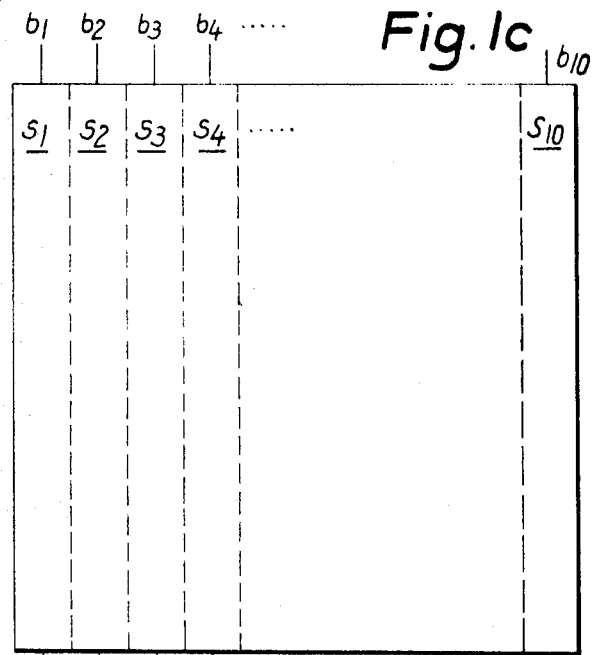
FIG. 1c is a plan view of an arrangement of the other set of conductive paths.
Figure 1D:
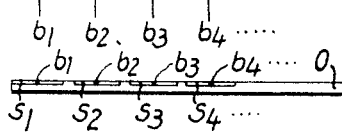
FIG. 1d is a side view of the arrangement of FIG. 1c.

An elastic synthetic foil O shown in FIGS. 1c and 1d is placed on top of these synthetic threads. This synthetic foil O is also provided with metallic conductive paths $S_1, S_2, S_3, S_4, ... S_{10}$ which are insulated from each other and whose direction is perpendicular to the direction of conductive paths $W_1 ... W_{10}$. Foil O is placed atop plate U so that the surface containing paths S faces the surface containing paths W. The conductive paths W and S are provided with contacts $a_1, ... a_{10}$, and $b_1, ... b_{10}$, respectively. The foil O of insulating synthetic is elastically tensioned in the direction of the plane which it forms by means of a mounting device (not shown). The conductive paths of baseplate U and foil O are separated from each other by a small distance determined by synthetic threads $P_0, ... P_{10}$.

A drawing surface, e.g. drawing paper (not shown), provided with a grid pattern corresponding to the intersecting conductive paths is applied to foil O. If a pen is caused to exert a pressure on the drawing surface, the two intersecting conductive paths of baseplate U and foil O at the point directly beneath the pen come in contact with each other. The resulting electrical contact is utilized for automatic indication and/or further processing.

Figure 2:
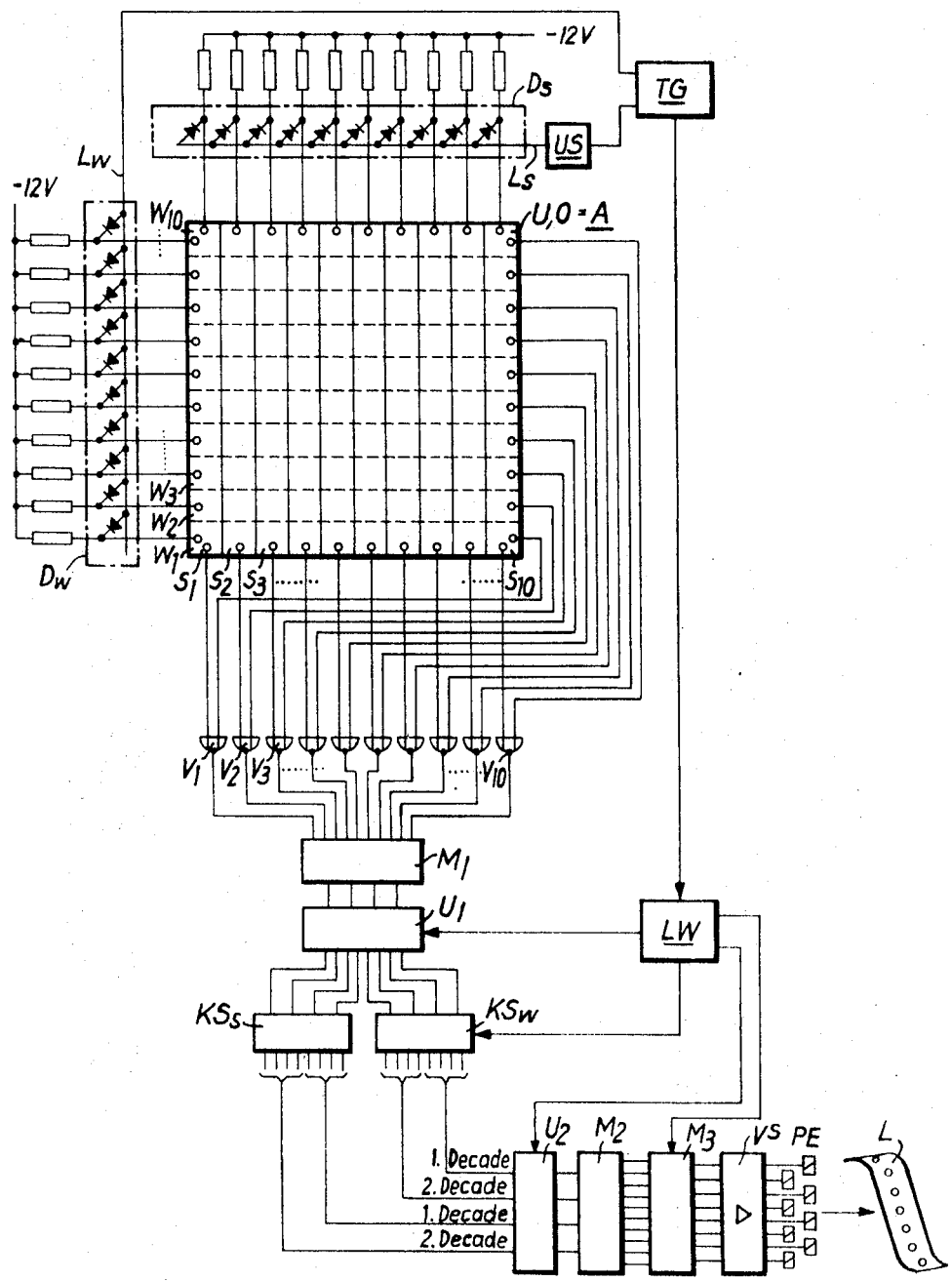
FIG. 2 is a block diagram of a processing circuit according to the invention.

A circuit for this purpose is shown in FIG. 2. The baseplate U and the superposed foil O together with the drawing surface will be considered a unit in the following description and are indicated as position field A. Position field A again has 10 vertical conductive paths $S_1, ... S_{10}$ and 10 horizontal conductive paths $W_1, ... W_{10}$, which are all provided with terminals at both ends.

The horizontal conductive paths $W_1, ... W_{10}$ are connected, via a decoupling diode gate circuit $D_w$, to a common line $L_w$, and the vertical conductive paths $S_1, ... S_{10}$, via a diode gate circuit $D_s$, to a common line $L_s$. Both lines serve to feed clock pulse signals whose values alternate between logic "0," corresponding to the occurrence of a pulse, and logic "L," corresponding to the intervals between pulses, and emitted by a pulse generator TG.

The clock pulse signals for lines $L_s$ and $L_w$ are shifted with respect to each other, which can be accomplished in a simple manner by a delay element US. The other terminals of the horizontal and vertical conductive paths are connected to the inputs of associated NOR elements $V_1, V_2, V_3, ... V_{10}$ whose output signals are applied to a first matrix $M_1$ where they are converted into a binary code. The binary code can be arbitrarily selected. For many types of applications, of course, the natural binary code or the binary-coded decimal form has proven to be advantageous.

The output signals from matrix $M_1$ are transferred, via an electronic switch $U_1$, consecutively, for example in tetrads for the binary-coded decimal form, into associated memory elements $KS_s$ and $KS_w$ from where they are delivered in tetrads, via a further electronic switch $U_2$, to a further coding matrix $M_2$, where they are converted into a signal representing a decimal integer of 1 to 10. The output signals of matrix $M_2$ are transferred to a further matrix $M_3$ which converts them into a certain tape punch code. The output signals of matrix $M_3$ are amplified, if required, by an amplifier VS and are fed to the control inputs of a punching device consisting, for example, of magnetically operated hole punches PE which punch one line of the tape L at a time.

All of the elements $U_1, KS_s, KS_w, U_2$ and $M_3$ are controlled by a control device LW which receives control pulses from generator TG so as to synchronized with the output signals from the generator. The elements LW, M, U, KS, VS, and PE can be constituted by commercially available devices which are well known in the art.

The arrangement operates as follows:

If no electric contact is established between the crossing conductive paths, one input of each NOR element $V_1, \ldots V_{10}$ receives an "L" signal and the other input a "0" signal due to the phase shift between the signals appearing on lines $L_s$ and $L_w$. The NOR elements thus do not emit an output signal.

If, by the pressure of drawing pen on the drawing surface, a contact is established between two crossing conductive paths, both inputs of the NOR elements which are connected with the contacting conductive paths will have the same potential during one timing period, one timing period corresponding to the appearance of a clock pulse on line $L_w$ and the subsequent appearance of a clock pulse on line $L_s$. The two NOR elements having one input each connected to a contacting path consecutively emit one output signal each upon the occurrence of the clock pulses during one timing period. If the two contacting paths are connected to the same NOR element, this element will emit consecutive output signals during a timing period.

These output signals are converted into binary-coded decimal form in the coding matrix $M_1$ and are transmitted via the switch $U_1$, under the control of element LW, to memory $KS_s$ or $KS_w$, transmission to $KS_s$ corresponding to the occurrence of a clock pulse on $L_w$ and transmission to $KS_w$ corresponding to a clock pulse on $L_s$. The conversion into a binary code is advantageous since it reduces the required number of subsequent memory elements which, however, can be constructed, in theory, to store decimal-coded signals.

The memory elements $KS_s$ and $KS_w$ are provided in order to eliminate further processing of signals resulting from the repeated contacting of the same conductive paths, which would lead to errors. The memory elements are so constructed that only those values are stored which are different with respect to at least one coordinate ($w$ or $s$) from the previous signal. This requires only a coincidence comparison of the present memory contents with the newly furnished data. The draftsman is thus able to guide the pressure pen over an area corresponding to the surface covered by two crossing conductive paths in any desired direction, e.g. to draw a large dot, a small circle, or the like, without any contacts occurring after the first contact being processed.

In the illustrated device A it would only be necessary that the memory elements $KS_s$ and $KS_w$ be constructed to store one tetrad of the binary-coded decimal signal which corresponds to one decimal digit, the complete location being represented by two digits. If the device is provided with up to 100 conductive paths in each set, which has not been illustrated to avoid confusion, the memory elements can be enlarged to each hold a further tetrad corresponding to a second decimal digit, as shown in FIG. 2.

The conversion from binary-coded decimal form to the punched tape code could be accomplished directly in a coding matrix. The illustrated intermediate coding into the decimal code has the further advantage, in addition to low apparatus cost, that the so-called address for an instruction can be fed by centrally located control mechanism LW to the punched tape before the actual instruction corresponding to a position is transmitted. This control mechanism, which is actuated by the clock pulses of the pulse generator TG, also controls switches $U_1$ and $U_2$ as well as the transfer of the signals into the memory elements.

The logic circuit constructed of NOR elements $V_1, \ldots V_{10}$ can also be realized by other elements, e.g. AND elements, when appropriately modified.

The conversion device according to the present invention is primarily intended for the transfer and storage of position values in numerical form. The thus resulting program carrier can be used, depending on the type and size of the control mechanism of the available processing machinery, to directly control these machines or, particularly with complicated control mechanisms, to serve as the information carrier for a program to be compiled in special computers.

In addition to the device for automatically transferring position values to a program carrier, further arrays of crossing conductive paths can be provided for enabling certain symbols, e.g. circuit symbols, to be automatically transferred to the program carrier.

FIG. 3 shows such an arrangement in which the position field A for the automatic transfer of position values is constructed as was described in connection with FIGS. 1a, 1b and 1c. An additional drawing field B contains circuit symbols, i.e. resistors, capacitors, transistors, diodes, measuring instruments, logic elements, and connecting symbols, i.e. circles, straight lines, etc., in each area overlying the crossing of two conductive paths.

The terminals $b_{11}, b_{12}, \ldots b_{18}, b_{19}$ and $b_{20}$ of the conductive paths $S_{11}, S_{12}, \ldots S_{20}$ and $a_{11}, a_{12}$ and $a_{13}$ of paths $W_{11}, W_{12}$ and $W_{13}$ are again connected at one side with NOR elements (not shown) and at the other side with lines which supply clock pulses representing the logic "0" and "L," the pulses on the S lines being shifted with respect to those on the W lines.

The outputs of the additional NOR elements again pass, via the switching matrix and the electronic switch $U_1$, to special memory elements (not shown) from where they are conducted, via the further switch $U_2$ and the matrices $M_2$ and $M_3$, to amplifiers and to the hole punches PE.

The operation occurring when the drawing field B is touched by a drawing pen corresponds to that described above with reference to FIG. 2. Thus, if a pen touches one of the areas marked with a circuit symbol, a contact between two crossing conductive paths is established which is converted into a certain combination of holes on the punched tape. It is of course also possible to surround the position field A on all sides by drawing areas corresponding to the field B of FIG. 3. A separation of the outputs of fields A and B, as shown, is actually not necessary. It increases, however, the possibility for erroneous signal combinations, and thus errors, to be detected in special testing devices.

A drawing or a printed circuit board can be produced, with the embodiment of FIG. 3, in that a draftsman draws a sketch, on a drawing surface which covers the position field A and which is appropriately divided into a grid, by first selecting a position on position field A with a drawing pen, then selecting a symbol in drawing field B which is to be drawn at this point or which is to be cut out of the conductive material. Then, for example, a further position is selected and on the drawing the connecting path, e.g. a straight line, is marked.

The data derived from these operations are transferred in the manner described above to a punched tape which thus contains, in addition to position values, the circuit symbols generally used in electrical engineering. This tape can then serve in an advantageous manner to furnish the data for a bank of computers which automatically prepare from this information a control program for a numerically controlled drawing machine or machine tool, which program can be transferred into a further punched tape or onto a magnetic tape. This program then enables the machine to draw a circuit diagram to any desired scale, to cut a printed circuit board and, if required, to provide it with its circuit elements.

The arrangement can be provided with an acoustic or optical indicator device which indicates the transfer of a signal to the program carrier, e.g. during the preparation of a punched tape.

It will be understood that the above description of the present invention is susceptible to various modifications, changes and adaptations.

I claim:

1. A device for automatically producing a numerical representation of the location of any elemental area on a working surface, comprising, in combination:

a. a first set of elongated, parallel, substantially coplanar conductive elements which are electrically isolated from each other;

b. a second set of elongated, parallel, substantially coplanar, conductive elements which are electrically isolated from each other and which are disposed adjacent said first set so that the planes defined by said two sets are substantially parallel and so that said elements of said first set are oriented transversely to said elements of said second set, said elements of said second set being elastically deformable in a direction transverse to their plane, and said two sets being spaced from one another to be normally out of contact and to permit an element of said second set to be elastically deformed to physically and conductively contact an element of said first set upon the application of a deforming pressure to the element of said second set;

c. said two sets of elements defining a matrix in which each region where an element of said second set crosses an element of said first set constitutes an elemental area of the working surface, wherein each such elemental area is defined by a unique combination of one element of each said set;

d. pulse generator means having a first output connected to the elements of said first set for applying a train of signal pulses thereto and a second output connected to the elements of said second set for applying thereto a train of signal pulses which occur during the intervals between the pulses applied to said first set so that only one said set receives a pulse at any instant; and e. a plurality of logic circuits, only one for each element in one of said sets of elements, each logic circuit having a first input connected directly and only to a respective one of the elements of said first set, a second input connected directly and only to a respective one of the elements of said second set, and an output at which a signal appears only when a signal appears simultaneously on the two elements connected to its said inputs;

f. whereby when contact is made between two crossing elements, a signal pulse applied to said first set will also appear on the crossing element of said second set and an output signal will be produced only by that logic circuit whose second input is connected to such crossing element of said second set, and a subsequent signal pulse applied to said second set will also appear on the crossing element of said first set and an output signal will be produced only by that logic circuit whose first input is connected to such crossing element of said first set.

2. An arrangement as defined in claim 1, further comprising an insulating baseplate supporting said first set of conductive elements and provided with parallel grooves separating said elements from each other, said arrangement further comprising elastic strips of insulating material disposed in said grooves.

3. An arrangement as defined in claim 2 wherein said elastic strips are constituted by synthetic threads which extend above the surface defined by said first set of conductive elements by an amount corresponding to the spacing between said sets.

4. An arrangement as defined in claim 3, further comprising a support unit supporting said elements of said second set and holding them in a tensioned state in position opposite, and at right angles to, said elements of said first set.

5. An arrangement as defined in claim 4 wherein said support unit is constituted by a flexible sheet stretched across said baseplate and carrying said elements of said second set in the form of thin bands of conductive material.

6. An arrangement as defined in claim 5, further comprising a drawing surface disposed on top of said matrix and provided with a grid pattern corresponding to the pattern formed by the crossing of the conductive paths of said two sets.

7. An arrangement as defined in claim 1, further comprising a time delay element connected in series with sad second output of said pulse generator.

8. An arrangement as defined in claim 7 wherein each said logic circuit is constituted by a NOR unit whose inputs are connected to conductive elements which cross in an area lying on one diagonal of said matrix.

9. An arrangement as defined in claim 8, further comprising a first matrix connected to the outputs of said logic circuits for converting the signal received from each said logic circuit into a respective binary-coded decimal signal.

10. An arrangement as defined in claim 9, further comprising a switching device connected to the output of said first matrix and two memory units each connected to said switching device for storing the signals produced by said first matrix.

11. An arrangement as defined in claim 10 wherein said memory units are arranged to inhibit the transfer of their contents when they receive a signal identical with that already stored.

12 An arrangement as defined in claim 10, further comprising a second switching device connected to the outputs of said memory units and a second matrix connected to said switching device to convert the outputs from said memory units into signals which are coded for application to an information carrier.

13. A device for automatically producing a numerical representation of the location of any elemental area on a working surface, comprising, in combination:

a. a first set of elongated, parallel, substantially coplanar conductive elements which are electrically isolated from each other;

b. a second set of elongated, parallel, substantially coplanar, conductive elements which are electrically isolated from each other and which are disposed adjacent said first set so that the planes defined by said two sets are substantially parallel and so that said elements of said first set are oriented transversely to said elements of said second set, said elements of said second set being elastically deformable in a direction transverse to their plane, and said two sets being spaced from one another to be normally out of contact and to permit an element of said second set to be elastically deformed to physically and conductively contact an element of said first set upon the application of a deforming pressure to the element of said second set;

c. said two sets of elements defining a matrix in which each region where an element of said second set crosses an element of said first set constitutes an elemental area of the working surface, wherein each such elemental area is defined by a unique combination of one element of each said set;

d. pulse generator means having a first output connected to the elements of said first set for applying a train of signal pulses thereto and a second output connected to the elements of said second set for applying thereto a train of signal pulses which occur during the intervals between the pulses applied to said first set so that only one said set receives a pulse at any instant; and e. a plurality of logic circuits each having a first input connected to a respective element of said first set, a second input connected to a respective element of said second set, and an output at which a signal appears only when a signal appears simultaneously on the two elements connected to its said inputs, whereby when contact is made between two crossing elements, a signal pulse applied to said first set will also appear on the crossing element of said second set and an output signal will be produced only by that logic circuit whose second input is connected to such crossing element of said second set, and a subsequent signal pulse applied to said second set will also appear on the crossing element of said first set and an output signal will be produced only by that logic circuit whose first input is connected to such crossing element of said first set;

f. a first matrix connected to the outputs of said logic circuits for converting the signal received from each said logic circuit into a respective binary-coded decimal signal;

g. a switching device connected to the output of said first matrix and two memory units each connected to said switching device for storing the signals produced by said first matrix; and h. a second switching device connected to the outputs of said memory units and a second matrix connected to said switching device to convert the outputs from said memory units into signals which are coded for application to an information carrier.

14. An arrangement as defined in claim 13, further comprising a plurality of amplifiers connected to the outputs of said second matrix and a plurality of information recording elements connected to the outputs of said amplifiers and arranged for applying the output of said second matrix to an information carrier.

15. An arrangement as defined in claim 14, further comprising means for applying to said second matrix an address signal for identifying the nature of the outputs from said memory elements.

16. A device for automatically producing a numerical representation of the location of any elemental area on a working surface, comprising, in combination:
 a. a first set of elongated, parallel, substantially coplanar conductive elements which are electrically isolated from each other;
 b. a second set of elongated, parallel, substantially coplanar, conductive elements which are electrically isolated from each other and which are disposed adjacent said first set so that the planes defined by said two sets are substantially parallel and so that said elements of said first set are oriented transversely to said elements of said second set, said elements of said second set being elastically deformable in a direction transverse to their plane, and said two sets being spaced from one another to be normally out of contact and to permit an element of said second set to be elastically deformed to physically and conductively contact an element of said first set upon the application of a deforming pressure to the element of said second set;
 c. said two sets of elements defining a matrix in which each region where an element of said second set crosses an element of said first set constitutes an elemental area of the working surface, wherein each such elemental area is defined by a unique combination of one element of each said set;
 d. pulse generator means having a first output connected to the elements of said first set for applying a train of signal pulses thereto and a second output connected to the elements of said second set for applying thereto a train of signal pulses which occur during the intervals between the pulses applied to said first set so that only one said set receives a pulse at any instant; and
 e. a plurality of logic circuits each having a first input connected to a respective element of said first set, a second input connected to a respective element of said second set, and an output at which a signal appears only when a signal appears simultaneously on the two elements connected to its said inputs, whereby when contact is made between two crossing elements, a signal pulse applied to said first set will also appear on the crossing element of said second set and an output signal will be produced only by that logic circuit whose second input is connected to such crossing element of said second set, and a subsequent signal pulse applied to said second set will also appear on the crossing element of said first set and an output signal will be produced only by that logic circuit whose first input is connected to such crossing element of said first set;
 f. a first matrix connected to the outputs of said logic circuits for converting the signal received from each said logic circuit into a respective binary-coded decimal signal, and a switching device connected to the output of said first matrix and two memory units each connected to said switching device for storing the signals produced by said first matrix, said memory units being arranged to inhibit the transfer of their contents when they receive a signal identical with that already stored.